United States Patent
Woo et al.

(10) Patent No.: US 12,489,165 B2
(45) Date of Patent: Dec. 2, 2025

(54) BATTERY MODULE FOR ENERGY STORAGE DEVICE

(71) Applicant: AMOGREENTECH CO., LTD., Gimpo-si (KR)

(72) Inventors: Jong Kwang Woo, Gimpo-si (KR); Dal Jin Park, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 625 days.

(21) Appl. No.: 17/760,088

(22) PCT Filed: Jan. 28, 2021

(86) PCT No.: PCT/KR2021/001176
§ 371 (c)(1),
(2) Date: Aug. 3, 2022

(87) PCT Pub. No.: WO2021/157958
PCT Pub. Date: Aug. 12, 2021

(65) Prior Publication Data
US 2023/0058365 A1    Feb. 23, 2023

(30) Foreign Application Priority Data
Feb. 5, 2020   (KR) .................. 10-2020-0013639

(51) Int. Cl.
*H01M 50/233* (2021.01)
*H01M 10/48* (2006.01)
(Continued)

(52) U.S. Cl.
CPC ....... *H01M 50/233* (2021.01); *H01M 10/486* (2013.01); *H01M 50/209* (2021.01); *H01M 50/507* (2021.01)

(58) Field of Classification Search
CPC ............. H01M 50/204; H01M 50/209; H01M 50/233; H01M 50/172–179; H01M 50/507; H01M 50/471; H01M 50/474
See application file for complete search history.

(56) References Cited

U.S. PATENT DOCUMENTS

2011/0008667 A1* 1/2011 Kwag ............... H01M 10/6556
429/123
2011/0076521 A1* 3/2011 Shimizu ............. H01M 50/529
429/82
(Continued)

FOREIGN PATENT DOCUMENTS

CN    102456857 A    5/2012
CN    105518902 A    4/2016
(Continued)

OTHER PUBLICATIONS

International Search Report for PCT/KR2021/001176 by Korean Intellectual Property Office dated May 7, 2021.
(Continued)

*Primary Examiner* — Marla D Mcconnell
*Assistant Examiner* — Julia S Caserto
(74) *Attorney, Agent, or Firm* — BROADVIEW IP LAW, PC

(57) ABSTRACT

A battery module comprises: battery cells which are arranged in one direction and electrically connected to each other via bus bars and each of which has a positive terminal and a negative terminal; a cover member which includes a front cover disposed on the front surface of the battery cells, a rear cover disposed on the rear surface of the battery cells, an upper cover for covering the upper surface of the battery cells, and a lower cover for covering the lower surface of the battery cells; a pair of connection parts which are electrically connected to the bus bars and disposed to be positioned on the rear cover side so as to be electrically connected to the
(Continued)

outside; and an insulation cover which is disposed between the upper cover and the upper surface of the battery cells to block physical contact between the bus bars.

12 Claims, 14 Drawing Sheets

(51) Int. Cl.
*H01M 50/209* (2021.01)
*H01M 50/507* (2021.01)

(56) References Cited

U.S. PATENT DOCUMENTS

| | | | | |
|---|---|---|---|---|
| 2012/0003505 A1* | 1/2012 | Kim | ............... | H01M 10/425 |
| | | | | 429/7 |
| 2012/0009447 A1 | 1/2012 | Ikeda et al. | | |
| 2012/0156541 A1* | 6/2012 | Sohn | ............... | H01M 10/6557 |
| | | | | 429/120 |
| 2012/0244397 A1* | 9/2012 | TenHouten | ......... | H01M 10/625 |
| | | | | 429/61 |
| 2012/0301747 A1* | 11/2012 | Han | ............... | H01M 50/256 |
| | | | | 429/7 |
| 2016/0336556 A1 | 11/2016 | Okutani et al. | | |
| 2018/0034014 A1* | 2/2018 | Ichikawa | ............... | H01M 50/30 |
| 2019/0081289 A1* | 3/2019 | Takabayashi | ....... | H01M 50/209 |
| 2019/0173138 A1 | 6/2019 | Tian | | |

FOREIGN PATENT DOCUMENTS

| | | |
|---|---|---|
| CN | 109473615 A | 3/2019 |
| JP | 2008-535176 A | 8/2008 |
| JP | 2015-138604 A | 7/2015 |
| KR | 10-2012-0132338 A | 12/2012 |
| KR | 10-1381592 B1 | 4/2014 |
| KR | 10-2015-0089483 A | 8/2015 |
| KR | 10-2018-0066683 A | 6/2018 |
| KR | 10-2018-0106688 A | 10/2018 |
| WO | 2017/169524 A1 | 10/2017 |

OTHER PUBLICATIONS

Office Action for IN 202247043313 by Intellectual Property India dated Jun. 20, 2024.
Supplementary European Search Report for EP 21750293.9 by European Patent Office dated Jul. 30, 2024.
Office Action for CN 202180010975.0 by China National Intellectual Property Administration dated Jul. 29, 2023.
Office Action for KR 10-2020-0013639 by Korean Intellectual Property Office dated Mar. 19, 2025.

* cited by examiner

BATTERY MODULE FOR ENERGY STORAGE DEVICE

CROSS-REFERENCE TO RELATED APPLICATIONS

This application is a National Phase Entry Application of PCT Application No. PCT/KR2021/001176 filed on Jan. 28, 2021, which claims priority to Korean Patent Application No. 10-2020-0013639 filed on Feb. 5, 2020, in Korean Intellectual Property Office, the entire contents of which are hereby incorporated by reference in its entirety.

TECHNICAL FIELD

The present invention relates to a battery module for an energy storage device.

BACKGROUND ART

Interest in energy is increasing due to factors such as resource depletion. Among them, as a way to match the demand and supply of electricity, an energy storage device for storing electricity and supplying electricity at a necessary place and time is being distributed.

Such an energy storage device is used for various purposes, such as power load movement, resource for power supply capacity, reserve power service, output stabilization of new & renewable energy power generation, voltage stabilization, migration of output power fluctuation, frequency adjustment, improvement of transmission stability, improvement of power quality, improvement of power reliability, and management of electricity rate.

As a part of it, a battery module for an energy storage device using a battery having a high energy density is being developed. Such a high-output battery module is implemented with a large capacity by connecting a plurality of battery cells in series and parallel to be used for driving a device that requires high output or whose output is not stabilized, for example, a wind power generator or a solar power generator.

However, energy storage devices to which the battery module is applied have various appearances, and there is a trend that the installation space for the battery module is decreasing.

For example, a container-type energy storage device such as Korean Patent Registration No. 10-1381592 has been proposed. However, this container type energy storage device has a problem in that the volume inside the container is reduced due to the use of double partition walls and the scattered parts. Although not shown, there is also a problem in that a large number of cables are intricately connected for the grid connection of the energy storage device, which increases the risk of fire.

Therefore, the shape of the battery module is required to be front-oriented, and it is urgent to develop a battery module having a light weight and high insulation of the battery.

DISCLOSURE

Technical Problem

The present invention has been devised in view of the above points, and an object of the present invention is to provide a battery module for an energy storage device that is configured in a retractable module form while improving insulation and heat dissipation, thereby improving assembility and easy maintenance.

Technical Solution

In order to achieve the above object, the present invention provides a battery module for an energy storage device, including a plurality of battery cells which is arranged in one direction and electrically connected to each other via a plurality of bus bars, each battery cell including a positive terminal and a negative terminal; a cover member which includes a front cover disposed on front surfaces of the battery cells, a rear cover disposed on rear surfaces of the battery cells, an upper cover for covering upper surfaces of the battery cells, and a lower cover for covering lower surfaces of the battery cells; a pair of connection parts which is electrically connected to the bus bars and disposed to be positioned on the rear cover so as to be electrically connected to an outside; and an insulation cover which is disposed between the upper cover and the upper surfaces of the battery cells to block physical contact between the plurality of bus bars.

In addition, the cover member may be made of an insulation material.

In addition, a plurality of partition spaces which is partitioned from each other to accommodate the plurality of bus bars may be formed on an upper surface of the insulation cover, and the plurality of bus bars may be individually accommodated in the plurality of partition spaces.

In addition, the insulation cover may include a plurality of through-holes respectively penetrating through positions corresponding to the plurality of partition spaces, and the positive and negative terminals of the battery cells pass through the plurality of through-holes from a lower side of the insulation cover to an upper side of the insulation cover, and then may be fastened to the bus bars disposed in the partition spaces via a fastening member.

In addition, the plurality of partition spaces may be partitioned from each other through a plurality of first partition members protruding at a predetermined height from an upper surface of the insulation cover.

In addition, a plurality of first accommodation spaces partitioned from each other may be formed on an upper surface of the lower cover so that lower sides of the plurality of battery cells are individually inserted, a plurality of second accommodation spaces partitioned from each other may be formed on a lower surface of the insulation cover so that upper sides of the plurality of battery cells are individually inserted, each of the battery cells may include an upper end inserted into the first accommodation spaces and a lower end inserted into the second accommodation spaces to be fixed by the insulation cover and the lower cover.

In addition, the plurality of first accommodation spaces may be partitioned from each other through a plurality of second partition members protruding at a predetermined height from the upper surface of the lower cover, the plurality of second accommodation spaces may be partitioned from each other through a plurality of third partition members protruding at a predetermined height from the lower surface of the insulation cover, two battery cells adjacent to each other may maintain a state spaced apart from each other by a predetermined interval through the second partition members and the third partition members.

In such a case, the first accommodation spaces and the second accommodation spaces may be formed to have a larger cross-sectional area than a cross-sectional area of the battery cells.

In addition, the insulation cover may include a pair of cut portions formed to be cut along a height direction on one end, the insulation cover may be disposed so that the end where the pair of cut portions is formed is positioned on an upper portion of the rear cover, the pair of connection parts may be exposed to the outside through the pair of cut portions in a state coupled to the bus bars.

In addition, the front cover may include a handle portion formed on an exposed surface.

In addition, a pair of plate members connecting the insulation cover and the lower cover to each other may be disposed inside the front cover and the rear cover, respectively, and the front cover and the rear cover may be respectively detachably coupled to the pair of plate members.

In addition, the battery module for an energy storage device may include at least one temperature sensor for detecting heat generated during operation of the batteries.

Advantageous Effect

The present invention has an advantage in that the assembility is improved and maintenance is easy by being configured in the form of a retractable module while improving insulation and heat dissipation.

Figure 1:
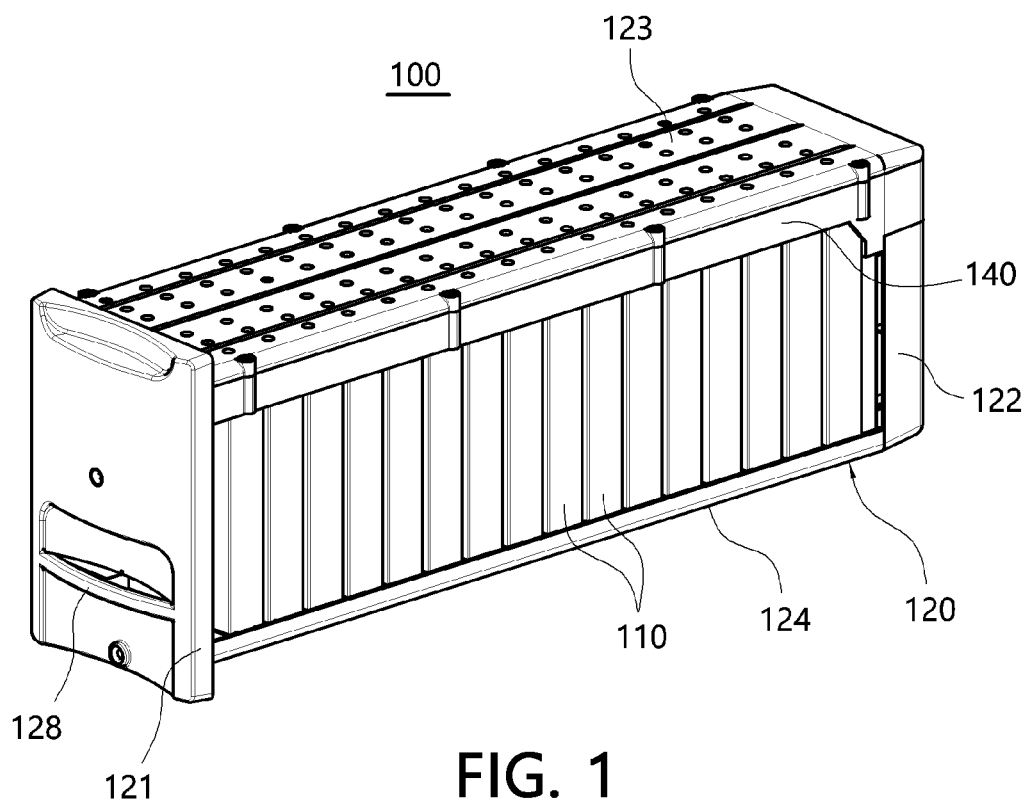
FIG. 1 is a view showing a battery module for an energy storage device according to one embodiment of the present invention.
Figure 2:
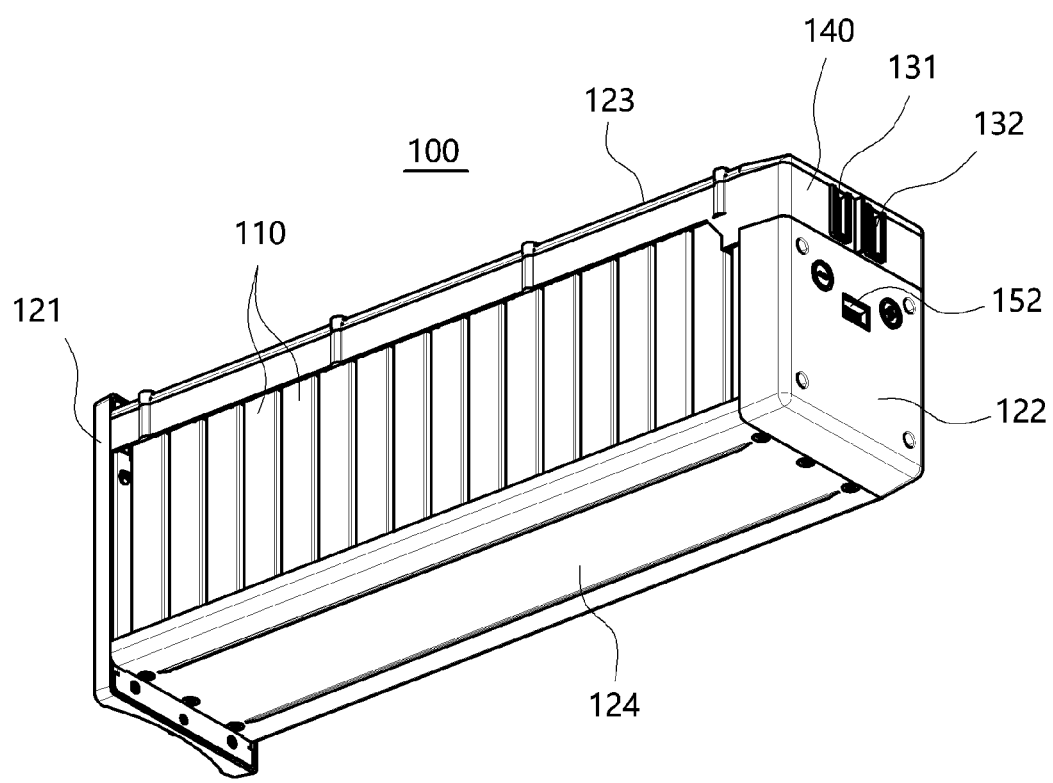
FIG. 2 is a view of FIG. 1 viewed from another direction.
Figure 3:
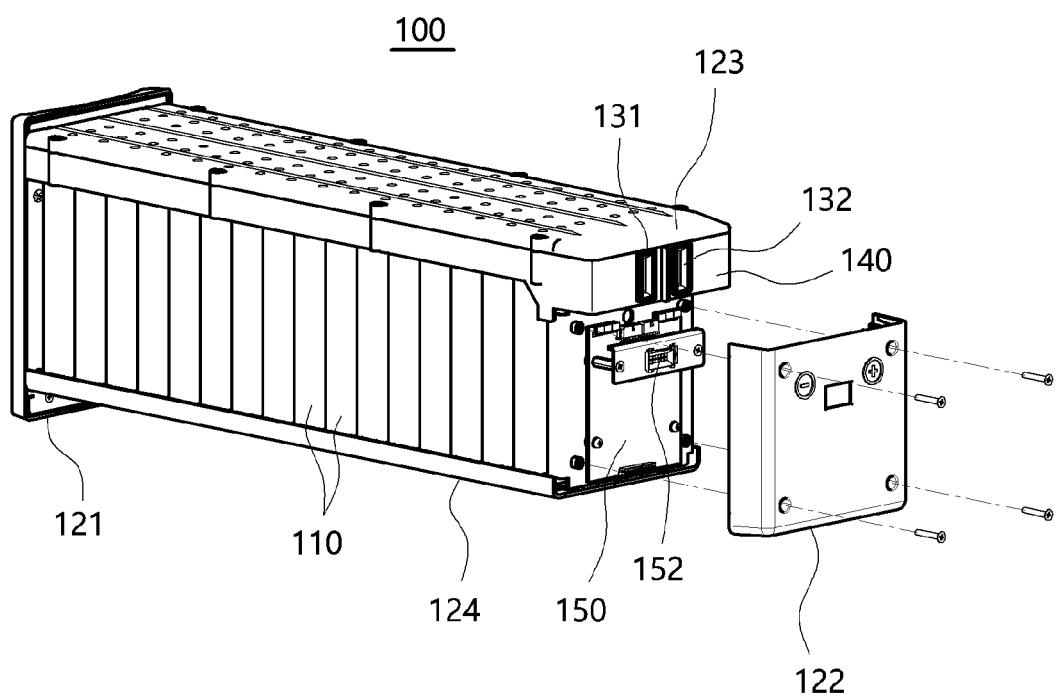
FIG. 3 is a view showing a state in which a rear cover is separated in FIG. 2.
Figure 4:
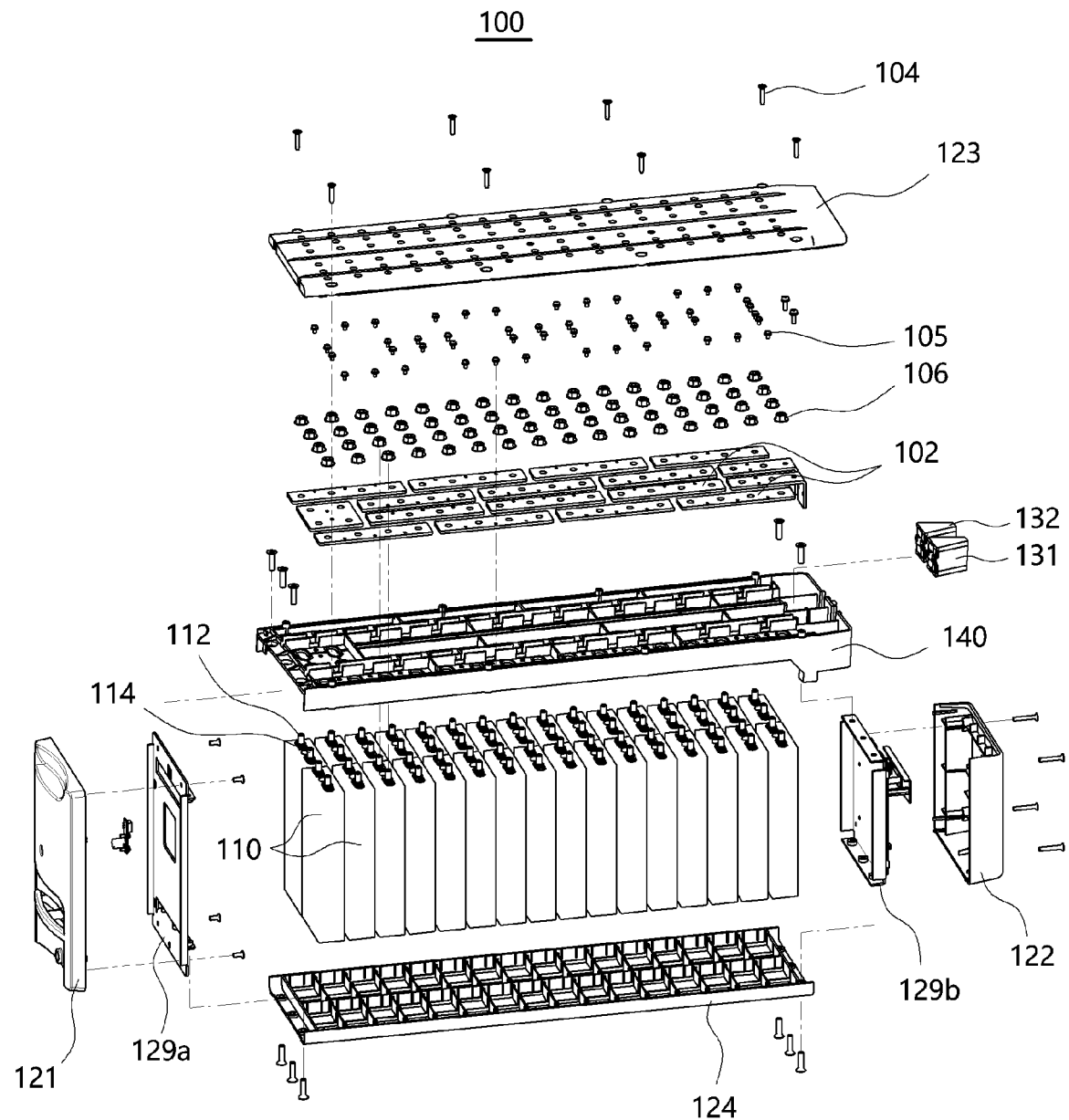
FIG. 4 is an exploded view of FIG. 1.

100: battery module for energy storage
102: bus bar
110: battery cell
114: negative terminal
104, 105, 106: fastening member
112: positive terminal
120: cover member -continued 121: front cover
123: upper cover
126: first accommodation space
128: handle portion
131, 132: connection portion
141: through-hole
143: first partition member
145: third partition member
150: circuit board
160: temperature sensor
S: separation space
122: rear cover
124: lower cover
127: second partition member
129a, 129b: plate member
140: insulation cover
142: partition space
144: second accommodation space
146: cut portion
152: communication port
d: interval
C: cable

MODE FOR INVENTION

Hereinafter, with reference to the accompanying drawings, the embodiments of the present invention will be described in detail so that those of ordinary skill in the art to which the present invention pertains can easily implement them. The present invention may be embodied in many different forms and is not limited to the embodiments described herein. In order to clearly explain the present invention in the drawings, parts irrelevant to the description are omitted, and the same reference numerals are assigned to the same or similar components throughout the specification.

A battery module 100 for an energy storage device according to one embodiment of the present invention may be used to drive a device that requires high output or whose output is not stabilized, for example, a wind power generator or a solar power generator.

However, the application example of the battery module 100 for an energy storage device according to one embodiment of the present invention is not limited thereto, and it may be applied to a known energy storage device used for various purposes such as power load movement, resource for power supply capacity, reserve power service, output stabilization of new & renewable energy power generation, voltage stabilization, migration of output power fluctuation, frequency adjustment, improvement of transmission stability, improvement of power quality, improvement of power reliability, and management of electricity rate.

As described above, the battery module 100 for an energy storage device according to one embodiment of the present invention includes a plurality of battery cells 110, a cover member 120, and a pair of connection parts 131, 132 and an insulation cover 140, as shown in FIGS. 1 to 4.

Each of the plurality of battery cells 110 may be provided with a positive terminal 112 and a negative terminal 114 for electrical connection, and the plurality of battery cells may be electrically connected to each other via a plurality of bus bars 102 in a state in which the plurality of battery cells is arranged in one direction.

Figure 5:
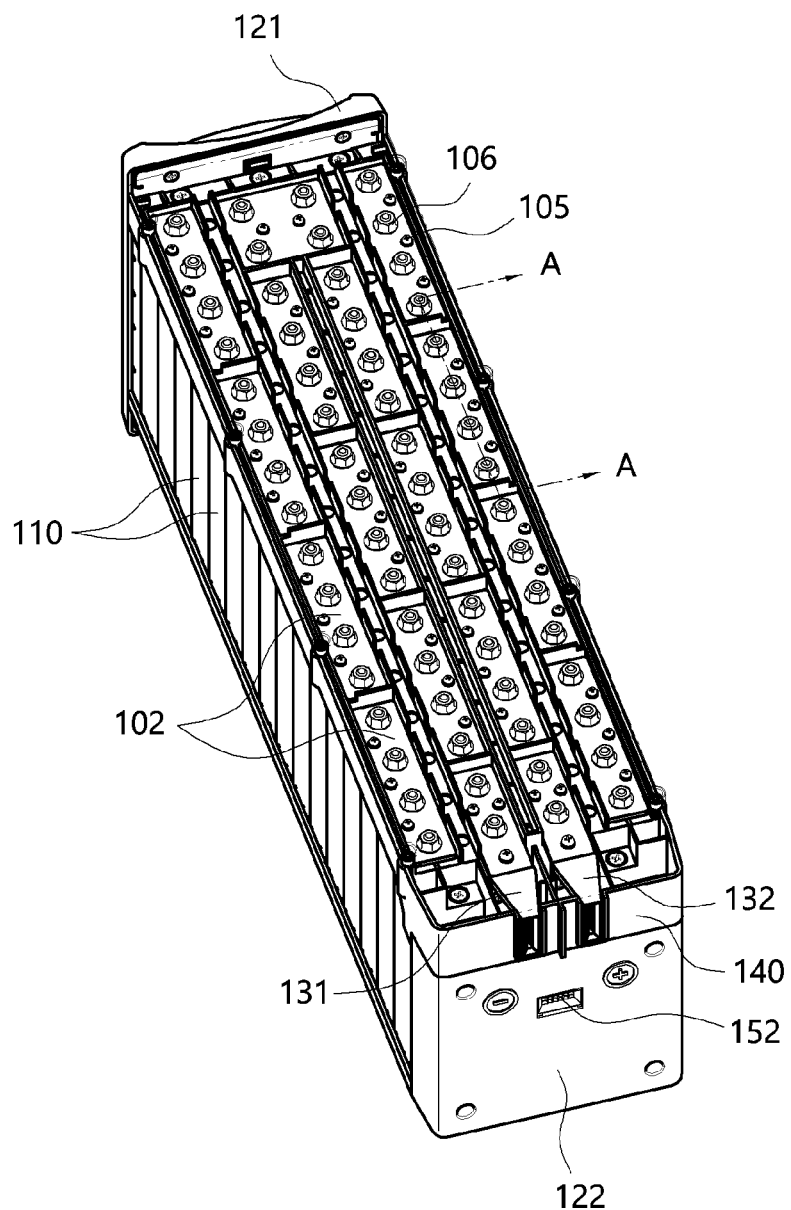
FIG. 5 is a view showing a state in which an upper cover is removed in FIG. 1.
Figure 6:
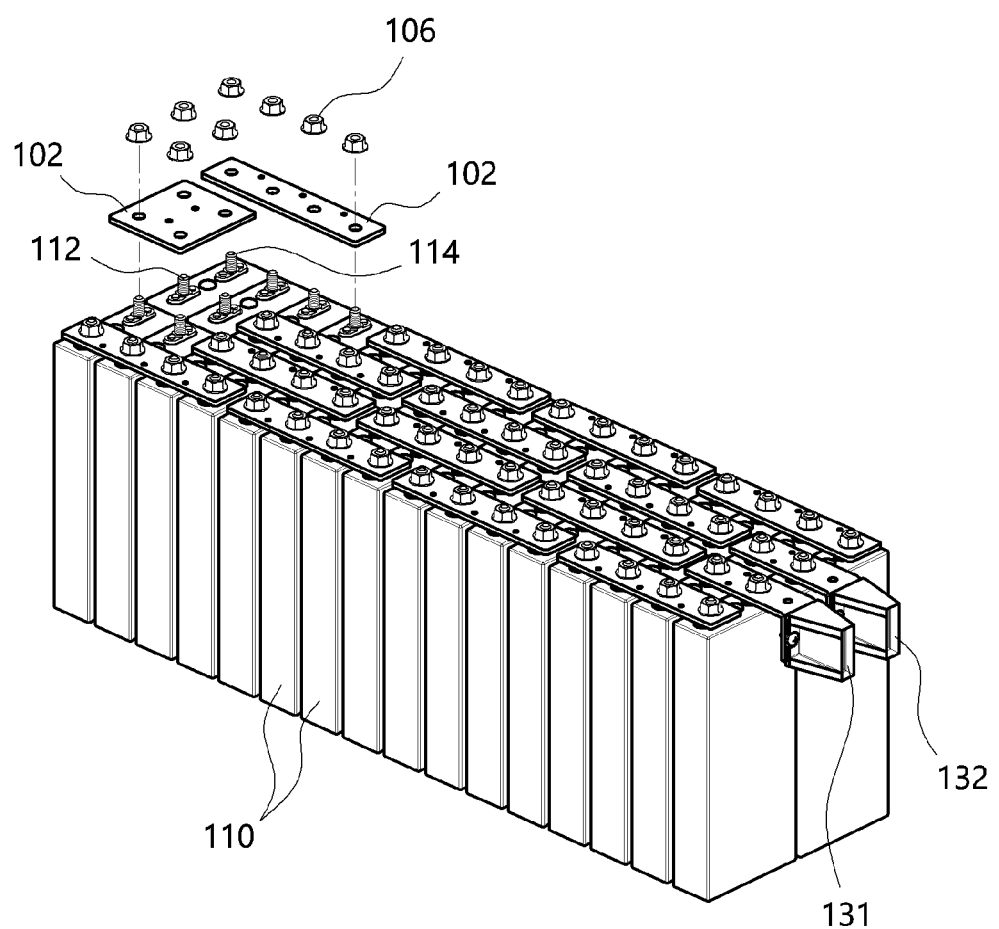
FIG. 6 is a view showing a state in which a cover member and an insulation cover are removed in FIG. 5.

For example, as shown in FIGS. 5 and 6, the plurality of battery cells 110 may be connected in a mixed form of serial connection and parallel connection via the plurality of bus bars 102.

Through this, the battery module 100 for an energy storage device according to one embodiment of the present invention may realize high output and have a large capacity through the plurality of battery cells 110 electrically connected to each other via the plurality of bus bars 102.

Here, the battery cells 110 may be prismatic batteries, and the positive terminal 112 and the negative terminal 114 may be provided to protrude in the same direction. Through this, the plurality of battery cells 110 may be electrically connected to each other through the plate-shaped bus bars 102 having a predetermined length.

However, the shape of the battery cells 110 is not limited thereto, and each battery cell may be provided in a cylindrical shape.

The cover member 120 may fix the plurality of battery cells 110 arranged in one direction, and the plurality of bus bars 102 electrically connecting the plurality of battery cells 110 can be prevented from being exposed to the outside.

That is, the plurality of battery cells 110 may be maintained in a state of being arranged in a line through the cover member 120, and may be electrically connected to each other only through the plurality of bus bars 102.

To this end, the cover member 120 may include a front cover 121 disposed on the front surfaces of the battery cells 110, a rear cover 122 disposed on the rear surfaces of the battery cells 110, and an upper cover 123 that covers the upper surfaces of the battery cells 110 and a lower cover 124 that covers the lower surfaces of the battery cells 110.

Through this, the front, rear, upper and lower surfaces of the plurality of battery cells 110 may not be exposed to the outside through the cover member 120 in a state in which they are electrically connected to each other through the plurality of bus bars 102.

In addition, the cover member 120 may be made of an insulation material to prevent a short circuit with an external component.

Figure 7:
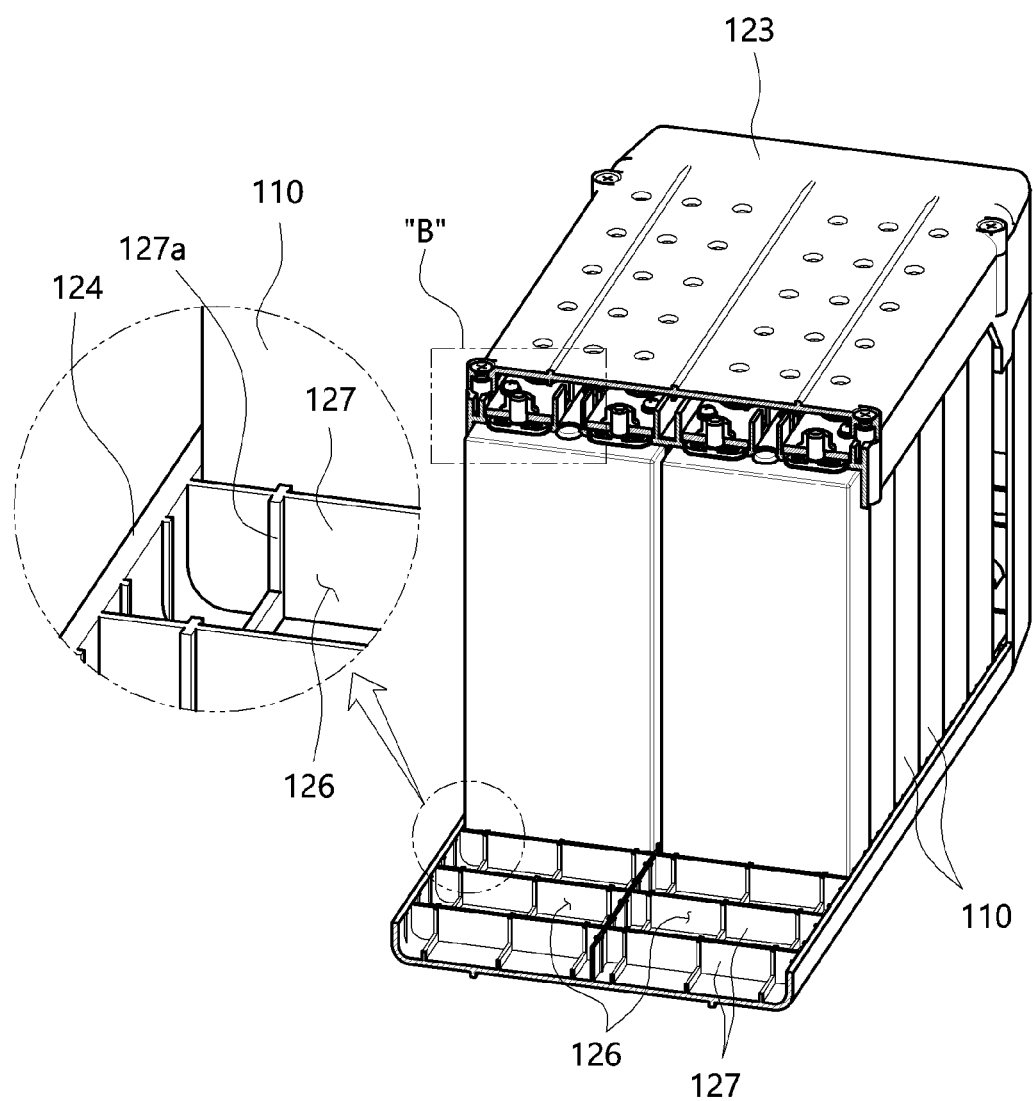
FIG. 7 is a view showing a state in which a part is cut in FIG. 1.
Figure 8:
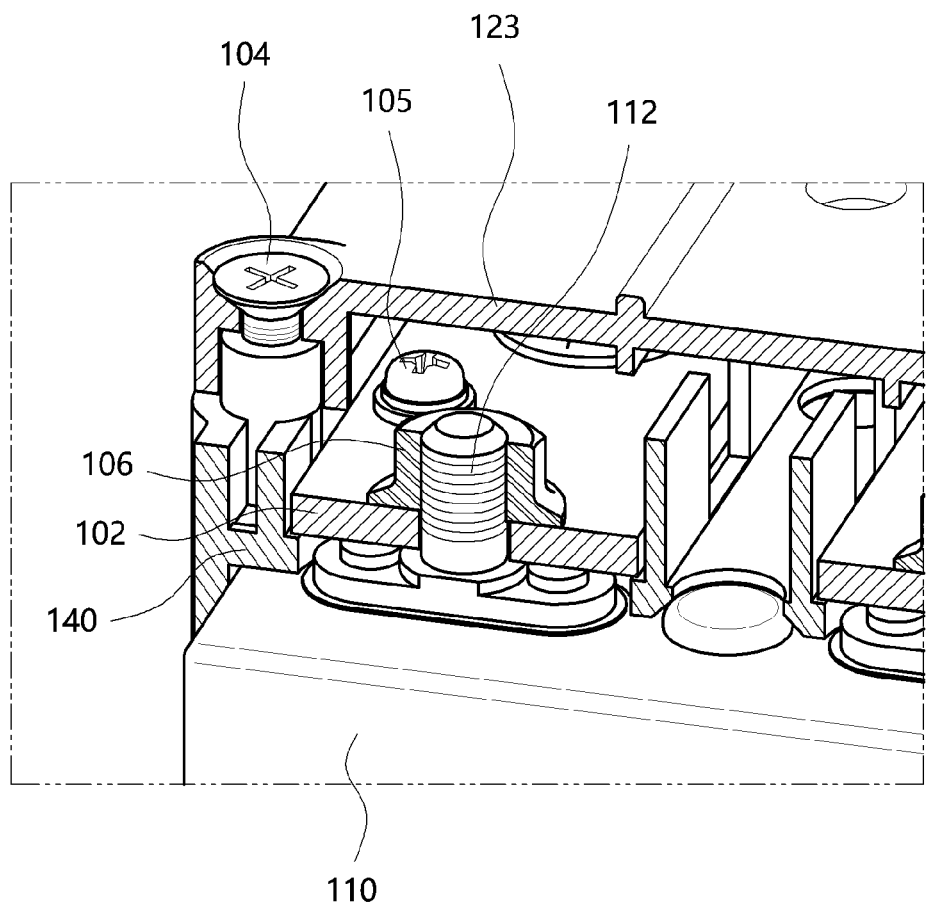
FIG. 8 is an enlarged view of "B" in FIG. 7.
Figure 9:
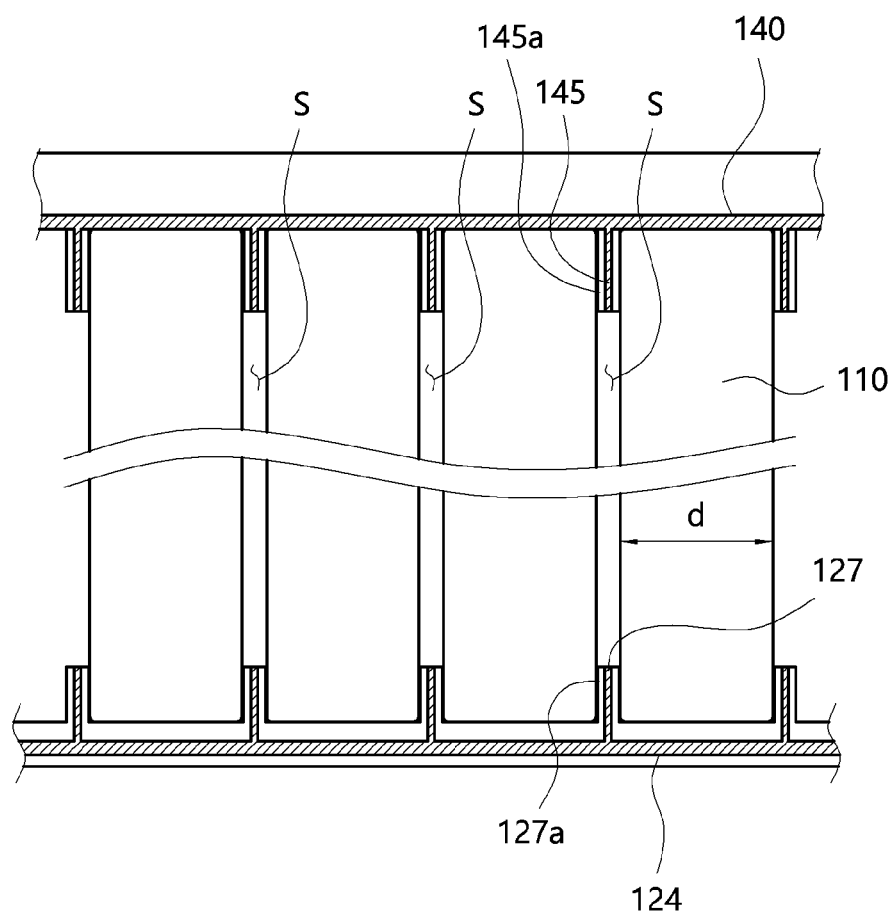
FIG. 9 is a cross-sectional view in the direction A-A in FIG. 5.

In this case, the battery module 100 for an energy storage device according to one embodiment of the present invention may include an insulation cover 140 disposed between the upper cover 123 and the upper surfaces of the battery cells 110, as shown in FIGS. 7 to 9.

In this case, the upper cover 123 may be fixed to the insulation cover 140 via a fastening member 104.

In this case, the insulation cover 140 may be made of an insulation material, and the plurality of bus bars 102 electrically connecting the plurality of battery cells 110 may be disposed on the upper surface of the insulation cover 140.

That is, the insulation cover 140 may insulate the plurality of bus bars 102 from each other by blocking physical contact of the plurality of bus bars 102 connecting the plurality of battery cells 110 to each other.

To this end, a plurality of partition spaces 142 may be formed on the upper surface of the insulation cover 140 to block the plurality of bus bars 102 from contacting each other while accommodating the plurality of bus bars 102.

Here, the plurality of bus bars 102 may be fixed to the upper surface of the insulation cover 140 via a separate fastening member 105 such as a bolt member.

Figure 10:
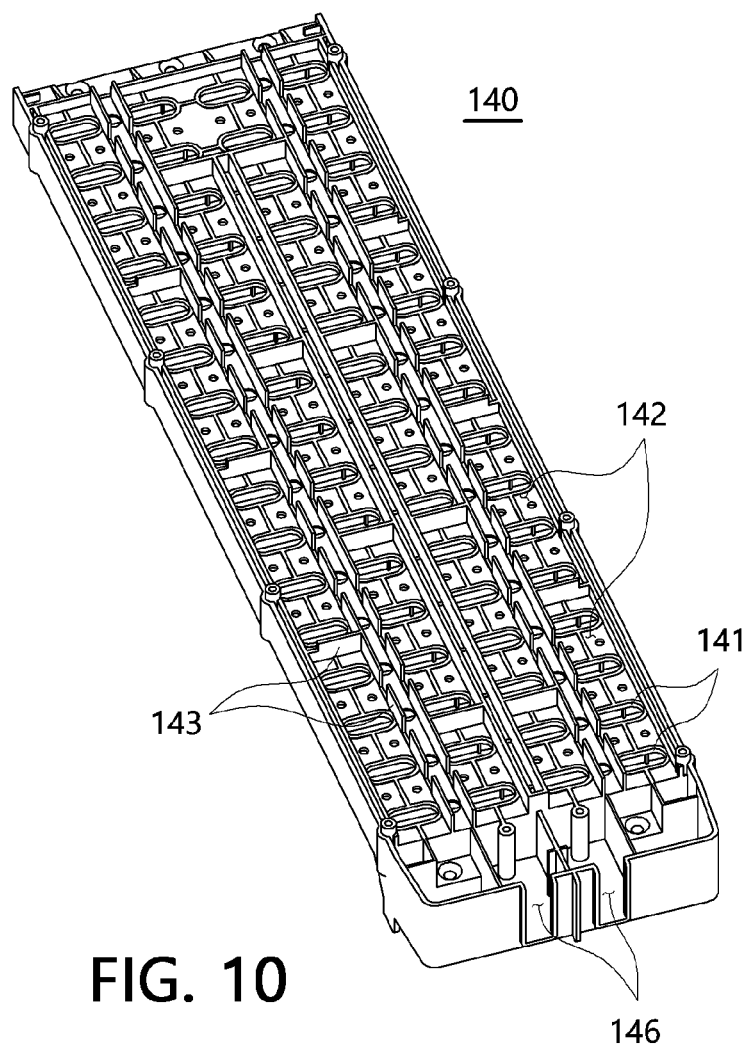
FIG. 10 is a view showing an insulation cover that may be applied to a battery module for an energy storage device according to one embodiment of the present invention.

For example, as shown in FIG. 10, the plurality of partition spaces 142 may be partitioned from each other through a plurality of first partition members 143 protruding at a predetermined height from the upper surface of the insulation cover 140.

Through this, the plurality of bus bars 102 may be individually accommodated in the plurality of partition spaces 142, and the physical contact of the bus bars may be blocked through the first partition members 143.

In this case, the insulation cover 140 may include a plurality of through-holes 141 that penetrates respectively at positions corresponding to the plurality of partition spaces 142.

Accordingly, as shown in FIG. 8, the positive terminals 112 and the negative terminals 114 of the plurality of battery cells 110 disposed on the lower side of the insulation cover 140 may pass through the plurality of through-holes 141 from the lower side of the insulation cover 140 toward the upper side of the insulation cover 140, and then, may be fastened to the bus bars 102 which are individually disposed in the plurality of partition spaces 142 through a separate fastening member 106 such as a nut member.

Through this, the plurality of bus bars 102 that electrically connects the plurality of battery cells 110 to each other is blocked from physical contact with each other, so that the energization of two bus bars 102 adjacent to each other through physical contact may be blocked.

Meanwhile, in the plurality of battery cells 110 arranged in one direction, a distance between two adjacent battery cells 110 may be maintained. That is, as shown in FIG. 9, a separation space (S) may be formed between two adjacent battery cells 110.

Through this, when the battery module 100 for an energy storage device according to one embodiment of the present invention is operated, the heat generated in each battery cell 110 can be smoothly discharged to the outside through the separation space (S). In addition, even if the battery cells 110 are expanded during the operation, two adjacent battery cells 110 may be prevented from contacting each other.

To this end, a plurality of first accommodation spaces 126 partitioned from each other may be formed on the upper surface of the lower cover 124 so that the lower sides of the plurality of battery cells 110 can be individually inserted, and a plurality of second accommodation spaces 144 partitioned from each other may be formed on the lower surface of the insulation cover 140 so that upper sides of the plurality of battery cells 110 can be individually inserted.

Here, the first accommodation spaces 126 and the second accommodation spaces 144 may be formed in a number corresponding to each other one-to-one, and the total number of the first accommodation spaces 126 and the second accommodation spaces 144 may be a number corresponding to the total number of the plurality of battery cells 110.

Figure 11:
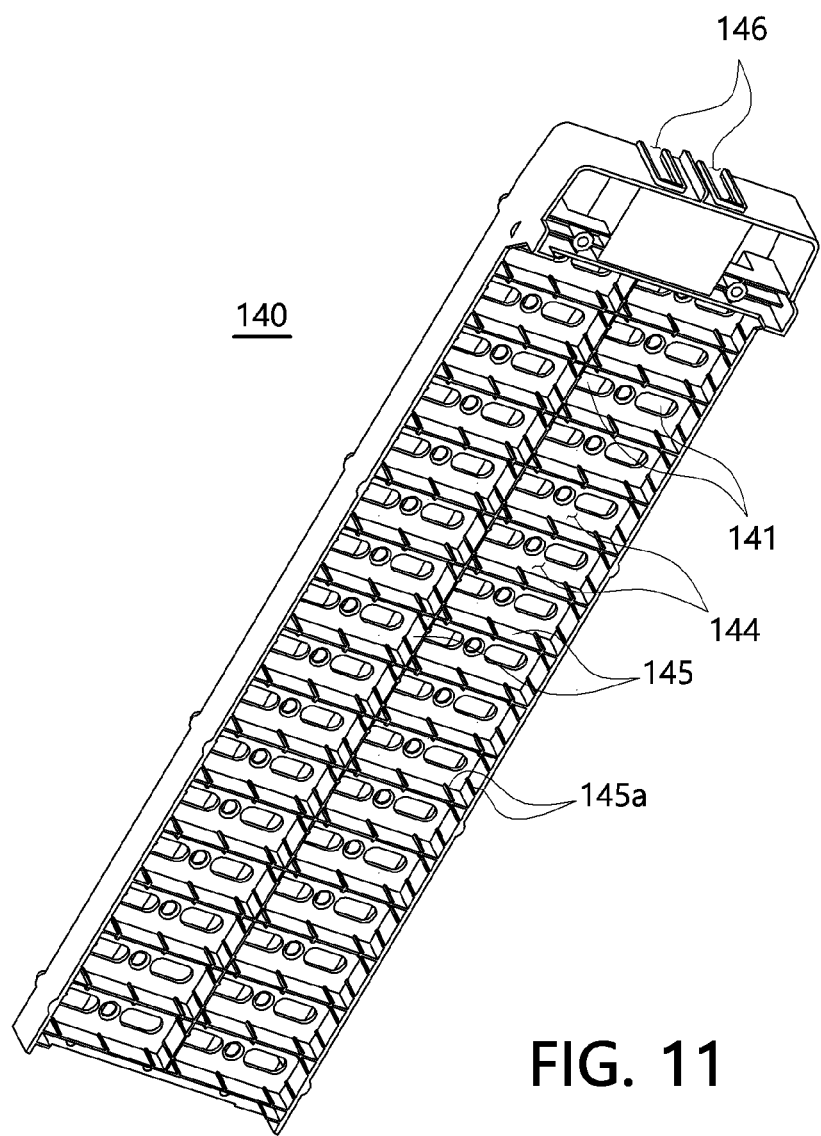
FIG. 11 is a bottom view of FIG. 10.
Figure 12:
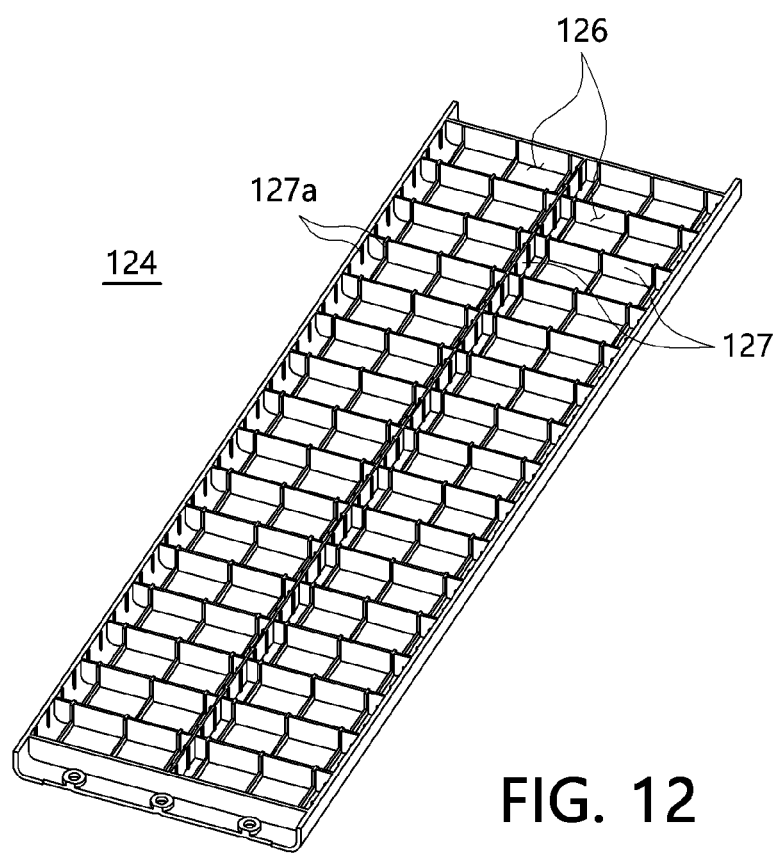
FIG. 12 is a view showing a lower cover that may be applied to a battery module for an energy storage device according to one embodiment of the present invention.

In addition, the plurality of first accommodation spaces 126 may be partitioned from each other through a plurality of second partition members 127 protruding at a predetermined height from the upper surface of the lower cover 124 as shown in FIG. 12. The plurality of second accommodation spaces 144 may be partitioned from each other through a plurality of third partition members 145 protruding at a predetermined height from the lower surface of the insulation cover 140 as shown in FIG. 11.

Accordingly, each battery cell 110 may have a lower end inserted into the first accommodation spaces 126 and an upper end inserted into the second accommodation spaces 144, and each battery cell 110 may be fixed by the insulation cover 140 and the lower cover 124.

Here, the insulation cover 140 and the lower cover 124 may be connected to each other via the front cover 121 and the rear cover 122, but they may be connected to each other through a pair of plate members 129a, 129b disposed on the inside of the front cover 121 and the rear cover 122. The front cover 121 and the rear cover 122 may be detachably coupled to the pair of plate members 129a, 129b, respectively.

Through this, the cover member 120 may reinforce structural strength through the pair of plate members 129a, 129b, and may firmly connect the insulation cover 140 and the lower surface cover 124.

In this case, a circuit board 150 may be provided on the plate member 129b disposed inside the rear cover 122, and various ports may be provided on the circuit board 150. Among the various ports, a communication port 152 for wired communication with an external device may be provided to be exposed to the outside through the rear cover 122.

In this case, two battery cells 110 having the lower side and the upper side respectively inserted into the first accommodation spaces 126 and the second accommodation spaces 144 and adjacent to each other may maintain a state spaced apart from each other through the second partition members 127 and the third partition members 145.

Through this, the separation space (S) may be formed between the two adjacent battery cells 110 through the second partition members 127 and the third partition members 145.

Here, the first accommodation spaces 126 and the second accommodation spaces 144 may be formed to have the same cross-sectional area as the cross-sectional area of the battery cells 110. However, they may be formed to have the larger cross-sectional area than the cross-sectional area of the battery cells 110.

Through this, as shown in FIG. 9, the interval (d) between the two adjacent battery cells 110 may have larger than the thickness of the second partition members 127 and the third partition members 145.

For this reason, when the battery module 100 for an energy storage device according to one embodiment of the present invention is operated, the heat generated in each battery cell 110 may be more smoothly discharged to the outside through the separation space (S). In addition, even if the battery cells 110 are expanded during the operation, two adjacent battery cells 110 may be prevented from contacting each other.

In this case, at least one protrusion rib 127*a*, 145*a* protruding outwardly may be provided on the second partition members 127 and the third partition members 145, respectively.

Accordingly, the upper sides and lower sides of the battery cells 110 inserted into the first accommodation spaces 126 and the second accommodation spaces 144, respectively, are in line contact with the protrusion ribs 127*a*, 145*a* on one surface, so that the battery cells may be prevented from moving in the first accommodation spaces 126 and the second accommodation spaces 144 through the protrusion ribs 127*a*, 145*a*.

Through this, in a state in which the upper end of each battery cell 110 is inserted into the first accommodation spaces 126 and the lower end of each battery cell 110 is inserted into the second accommodation spaces 144, the upper and lower ends of the battery cells 110 make contact with the protrusion ribs 127*a*, 145*a*, respectively, so that the battery cells 110 can be maintained in a fixed state by the insulation cover 140 and the lower cover 124.

The pair of connection parts 131, 132 may be configured for electrical connection with the outside. Such a pair of connection parts 131, 132 may include a positive connector 131 and a negative connector 132, and may be respectively connected to any two of the plurality of bus bars 102.

In this case, the pair of connection parts 131, 132 may be disposed to be positioned on the rear cover 122 of the cover member 120.

Through this, in the battery module 100 for an energy storage device according to one embodiment of the present invention, electrical connection with an external device may be detachably connected through the pair of connection parts 131, 132 disposed on the rear cover 122.

For this reason, the electrical connection is implemented in a detachable manner using the pair of connection parts 131, 132 disposed on the rear cover 122, and thus, the battery module 100 for an energy storage device according to one embodiment of the present invention may be implemented in a retractable type.

Figure 14:
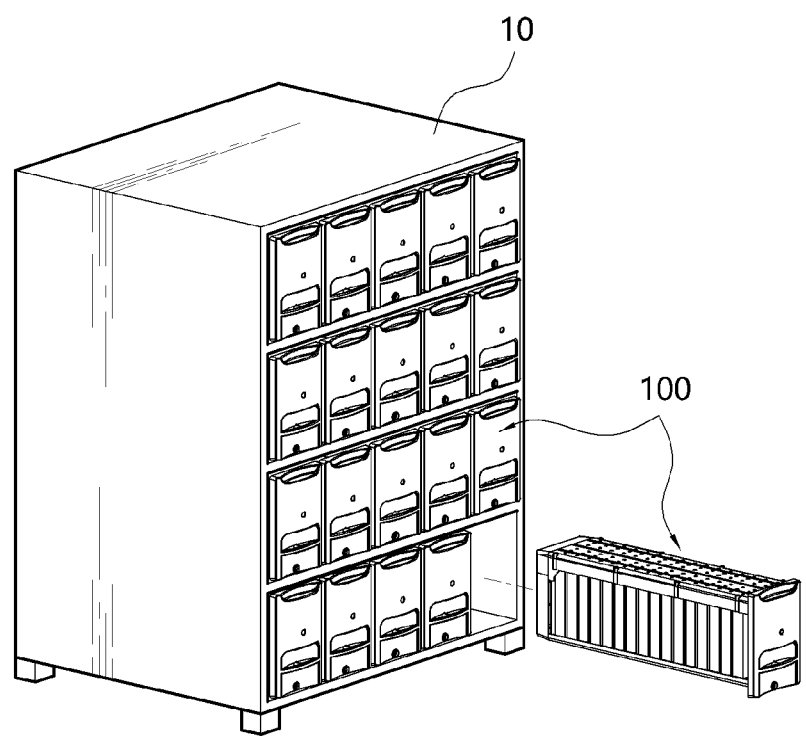
FIG. 14 is a view of a state in which a battery module for an energy storage device according to one embodiment of the present invention is used.

That is, as shown in FIG. 14, the battery module 100 for an energy storage device according to one embodiment of the present invention is implemented in a retractable type and may be coupled to a body 10 of the energy storage device in a manner that the battery module 100 is easily inserted into the body 10 of the energy storage device.

Through this, the battery module 100 for an energy storage device according to one embodiment of the present invention may be configured in the form of a retractable module while improving insulation and heat dissipation, so it has the advantage of increasing assembly and easy maintenance.

For example, the pair of connection parts 131, 132 may be disposed to be positioned on the rear cover 122 through a method of being fixed to the insulation cover 140.

As a non-limiting example, the insulation cover 140 may include a pair of cut portions 146 that is cut along the height direction on one end. The end of the insulation cover 140 on which the pair of cut portions 146 is formed may be disposed so as to be positioned on the upper portion of the rear cover 122.

Through this, the pair of connection parts 131, 132 may be exposed to the outside through the pair of cut portions 146 in a state in which one end of the connection parts is coupled to the bus bars 102, and may be disposed so as to be exposed to the outside from the rear of the battery module 100 in which the rear cover 122 is positioned.

In this case, a handle portion 128 may be formed on an exposed surface of the front cover 121 so that a user or an operator can easily assemble it.

Accordingly, the user or operator assembles the battery module 100 for an energy storage device according to one embodiment of the present invention through the handle portion 128, and may insert the battery module 100 toward the body 10 of the energy storage device or may easily separate the battery module 100 from the body 10 of the energy storage device.

Figure 13:
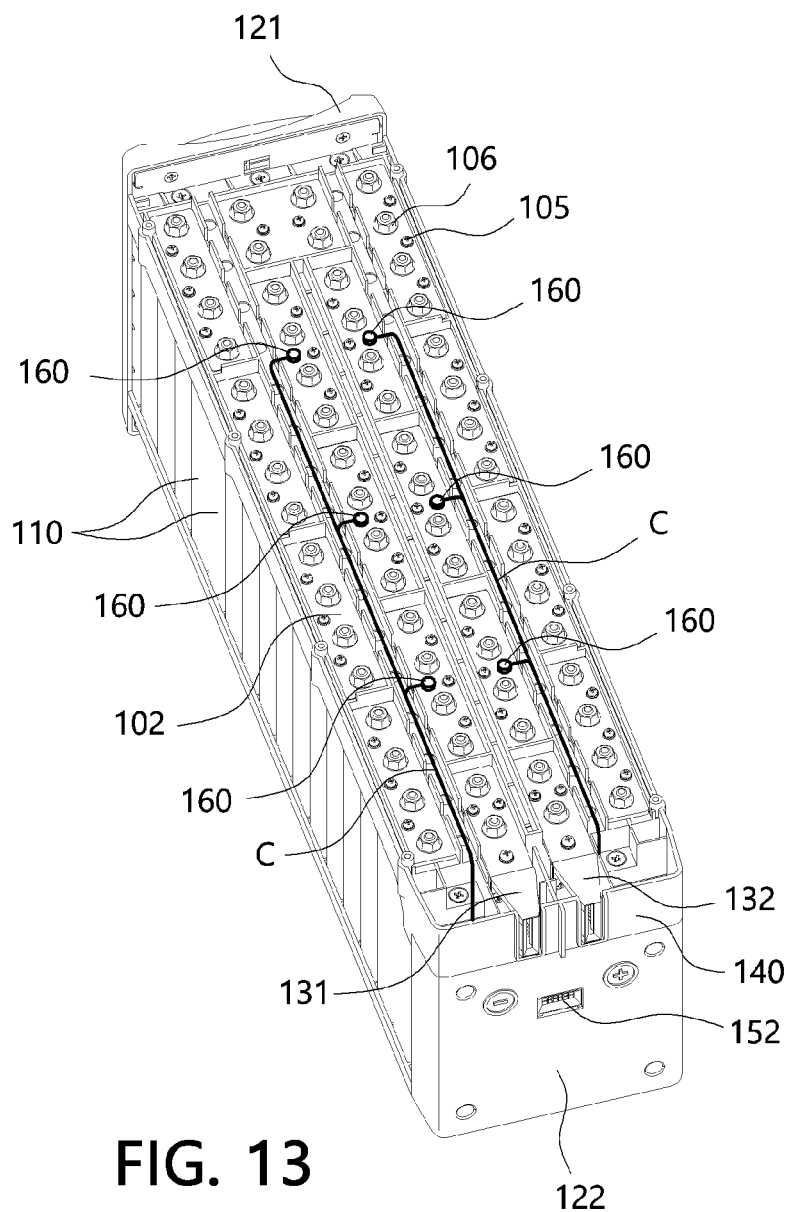
FIG. 13 is a view showing a state in which a temperature sensor is applied to FIG. 5.

On the other hand, the battery module 100 for an energy storage device according to one embodiment of the present invention may include at least one temperature sensor 160 for detecting the heat generated in each battery cell 110 as shown in FIG. 13.

The temperature sensor 160 may be disposed to be positioned on the bus bars 102 that electrically connect the plurality of battery cells 110 to each other, and may be electrically connected with the circuit board 150 via the cable C.

Accordingly, the information obtained through the temperature sensor 160 may be transmitted to the outside through the communication port 152 of the circuit board 150.

As an example, the temperature sensor 160 may be provided in each of the plurality of bus bars 102, or may be disposed to be positioned on the bus bars 102 connecting the battery cells 110 positioned an inside where relatively lot of heat is generated.

On the other hand, in the drawings and description, the partition spaces 142, the first accommodation spaces 126 and the second accommodation spaces 144 are illustrated and described as being formed through the partition members 127, 143, 145, but the present invention is limited thereto. It should be noted that the partition spaces 142, the first accommodation spaces 126, and the second accommodation spaces 144 may be formed as accommodation grooves that are drawn inward from one surface.

Although one embodiment of the present invention has been described above, the spirit of the present invention is not limited to the embodiments presented herein, and those skilled in the art who understand the spirit of the present invention will be able to easily suggest other embodiments by adding, changing, deleting, or including components within the scope of the same spirit, but this will also fall within the scope of the spirit of the present invention.

The invention claimed is:

1. A battery module for an energy storage device, comprising:
    a plurality of battery cells which is arranged in one direction and electrically connected to each other via a plurality of bus bars, each battery cell including a positive terminal and a negative terminal;
    a cover member which includes a front cover disposed on front surfaces of the battery cells, a rear cover disposed on rear surfaces of the battery cells, an upper cover for covering upper surfaces of the battery cells, and a lower cover for covering lower surfaces of the battery cells;
    a pair of connection parts which is electrically connected to the bus bars and disposed to be positioned on the rear cover so as to be electrically connected to an outside of the battery module; and
    an insulation cover which is disposed between the upper cover and the upper surfaces of the battery cells to block physical contact between the plurality of bus bars,
    wherein a plurality of first accommodation spaces partitioned from each other is formed on an upper surface of the lower cover so that lower sides of the plurality of battery cells are individually inserted,
    wherein a plurality of second accommodation spaces partitioned from each other is formed on a lower surface of the insulation cover so that upper sides of the plurality of battery cells are individually inserted,
    wherein the plurality of first accommodation spaces is partitioned from each other through a plurality of second partition members protruding at a predetermined height from the upper surface of the lower cover,
    wherein the plurality of second accommodation spaces is partitioned from each other through a plurality of third partition members protruding at a predetermined height from the lower surface of the insulation cover,
    wherein the plurality of second partition members and the plurality of third partition members are provided with protrusion ribs, respectively,
    wherein the protrusion ribs are in contact with the plurality of battery cells inserted in the plurality of first accommodation spaces and the plurality of second accommodation spaces,
    wherein an interval between two battery cells adjacent to each other is greater than a thickness of one of the plurality of second partition members or one of the plurality of third partition members,
    wherein a separation space is formed between one of the plurality of second partition members and one of the plurality of third partition members, wherein the two battery cells are spaced apart from the one of the plurality of second partition members and the one of the plurality of third partitions members by a preset distance, wherein each of the protrusion ribs of the plurality of second partition members comprise a first portion in physical contact with a surface of a second partition member of the plurality of second partition members, a second portion that extends along the lower cover, and a third portion in physical contact with a surface of an adjacent second partition member of the plurality of second partition members, and wherein the first portion and the third portion extend along the total length of the second partition member it is in physical contact with.

2. The battery module for an energy storage device according to claim 1, wherein the cover member is made of an insulation material.

3. The battery module for an energy storage device according to claim 1, wherein a plurality of partition spaces which is partitioned from each other to accommodate the plurality of bus bars is formed on an upper surface of the insulation cover, and each bus bar of the plurality of bus bars is individually accommodated in one of the partition spaces of the plurality of partition spaces.

4. The battery module for an energy storage device according to claim 3, wherein the insulation cover includes a plurality of through-holes respectively penetrating through positions corresponding to the plurality of partition spaces, and
    wherein the positive and negative terminals of the battery cells pass through the plurality of through-holes from a lower side of the insulation cover to an upper side of the insulation cover, and then are fastened to the bus bars disposed in the partition spaces via a fastening member.

5. The battery module for an energy storage device according to claim 3, wherein the plurality of partition spaces is partitioned from each other through a plurality of first partition members protruding at a predetermined height from an upper surface of the insulation cover.

6. The battery module for an energy storage device according to claim 1,
    wherein each of the battery cells includes a lower end inserted into the first accommodation spaces and an upper end inserted into the second accommodation spaces to be fixed by the insulation cover and the lower cover.

7. The battery module for an energy storage device according to claim 1,
    wherein the two battery cells adjacent to each other maintain a state spaced apart from each other by a predetermined interval through the second partition members and the third partition members.

8. The battery module for an energy storage device according to claim 1, wherein the first accommodation spaces and the second accommodation spaces are formed to have a larger cross-sectional area than a cross-sectional area of the battery cells.

9. The battery module for an energy storage device according to claim 1, wherein the insulation cover includes a pair of cut portions formed to be cut along a height direction on one end,
    wherein the insulation cover is disposed so that the end where the pair of cut portions is formed is positioned on an upper portion of the rear cover, and
    wherein the pair of connection parts is exposed to the outside through the pair of cut portions in a state coupled to the bus bars.

10. The battery module for an energy storage device according to claim 1, wherein the front cover includes a handle portion formed on an exposed surface.

11. The battery module for an energy storage device according to claim 1, comprising a pair of plate members for connecting the insulation cover and the lower cover to each other, wherein one of the plate members of the pair of plate members is disposed inside the front cover, wherein the other plate member of the pair of plate member is disposed inside the rear cover, and wherein the front cover and the rear cover are respectively detachably coupled to the pair of plate members.

12. The battery module for an energy storage device according to claim 1, comprising at least one temperature sensor for detecting heat generated during operation of the batteries.

* * * * *